(12) United States Patent
Greenberger et al.

(10) Patent No.: US 11,176,094 B2
(45) Date of Patent: Nov. 16, 2021

(54) DYNAMIC FILE NAME GENERATION FOR A PLURALITY OF DEVICES

(71) Applicant: INTERNATIONAL BUSINESS MACHINES CORPORATION, Armonk, NY (US)

(72) Inventors: Jeremy A. Greenberger, San Jose, CA (US); Zachary M. Greenberger, Raleigh, NC (US); Trudy L. Hewitt, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 91 days.

(21) Appl. No.: 16/694,409

(22) Filed: Nov. 25, 2019

(65) Prior Publication Data

US 2020/0089656 A1     Mar. 19, 2020

Related U.S. Application Data

(63) Continuation of application No. 15/800,198, filed on Nov. 1, 2017, now Pat. No. 10,565,164.

(51) Int. Cl.
  *G06F 16/00* (2019.01)
  *G06F 16/16* (2019.01)
  (Continued)

(52) U.S. Cl.
  CPC .......... *G06F 16/164* (2019.01); *G06F 3/0613* (2013.01); *G06F 16/13* (2019.01);
  (Continued)

(58) Field of Classification Search
  CPC ...... G06F 16/164; G06F 16/166; G06F 16/13; G06F 3/0613; G06F 16/119; G06F 16/184; H04L 67/1097
  See application file for complete search history.

(56) References Cited

U.S. PATENT DOCUMENTS 5,517,605 A   5/1996  Wolf
5,848,261 A   12/1998 Farry et al.
          (Continued)

FOREIGN PATENT DOCUMENTS

CN      103401908       11/2013

OTHER PUBLICATIONS

Mell et al., "The NIST Definition of Cloud Computing", NIST, Special Publication 800-145, Sep. 2011, 7 pages.
(Continued)

*Primary Examiner* — Jared M Bibbee
(74) *Attorney, Agent, or Firm* — William Hartwell; Andrew D. Wright; Roberts Calderon Safran & Cole, P.C.

(57) ABSTRACT

Approaches for dynamic file name generation are provided. A computer-implemented method includes: receiving, by a naming server, user input defining a file naming convention; associating, by the naming server, the file naming convention with a user account; receiving, by the naming server, a first request for a file name from a first user device associated with the user account; generating, by the naming server, a first file name using the file naming convention in response to the first request; transmitting, by the naming server, the first file name to the first user device; receiving, by the naming server, a second request for a file name from a second user device associated with the user account, the second user device being different from the first user device; generating, by the naming server, a second file name using the file naming convention in response to the second request; and transmitting, by the naming server, the second file name to the second user device.

20 Claims, 8 Drawing Sheets

(51) Int. Cl.
- H04L 29/08 (2006.01)
- G06F 3/06 (2006.01)
- G06F 16/13 (2019.01)
- *G06F 16/11* (2019.01)
- *G06F 16/182* (2019.01)

(52) U.S. Cl.
CPC ........ G06F 16/166 (2019.01); H04L 67/1097 (2013.01); *G06F 16/119* (2019.01); *G06F 16/184* (2019.01)

(56) References Cited

U.S. PATENT DOCUMENTS

| | | | |
|---|---|---|---|
| 5,933,633 | A | 8/1999 | Good et al. |
| 6,219,829 | B1 | 4/2001 | Sivakumar et al. |
| 7,002,700 | B1* | 2/2006 | Motamed ........... H04N 1/00384 358/1.1 |
| 8,484,260 | B2 | 7/2013 | Caso et al. |
| 9,055,410 | B2 | 6/2015 | Deshpande |
| 9,128,939 | B2 | 9/2015 | Kinsella |
| 9,135,565 | B1 | 9/2015 | Khalefa et al. |
| 2002/0042859 | A1* | 4/2002 | Lowry ................ G06F 21/6245 711/100 |
| 2002/0078069 | A1 | 6/2002 | Moore |
| 2004/0107204 | A1* | 6/2004 | Sakamoto ............... G06F 16/10 |
| 2004/0226048 | A1 | 11/2004 | Alpert et al. |
| 2009/0144300 | A1 | 6/2009 | Chatley et al. |
| 2013/0226876 | A1 | 8/2013 | Gati et al. |
| 2015/0052159 | A1* | 2/2015 | Liu ....................... G06F 16/166 707/754 |
| 2015/0261775 | A1* | 9/2015 | Shin ..................... G06F 16/164 707/827 |
| 2019/0129955 | A1 | 5/2019 | Greenberger et al. |

OTHER PUBLICATIONS

Denker et al., "Practically Trivial Parallel Data Processing in a Neuroscience Laboratory", Chapter 20 of Analysis of Parallel Spike Trains, vol. 7, 2010, p. 413-436.

Quickly and easily rename files and folders, http://www.rename-expert.com/, Gillmeister Software, Accessed Oct. 31, 2017, 9 pages.

Numbering files, Extensive options for customizing the numbering, http://www.rename-expert.com/features/numbering_files.aspx, Accessed Oct. 31, 2017, 2 pages.

List of IBM Patents or Patent Applications Treated as Related, dated Nov. 25, 2019, 1 page.

\* cited by examiner

DYNAMIC FILE NAME GENERATION FOR A PLURALITY OF DEVICES

BACKGROUND

The present invention generally relates to file naming and, more particularly, to dynamic file name generation for a plurality of devices.

Software applications that save files on computer devices employ naming conventions. Different applications typically employ different naming conventions. For example, a first software application running on a computer device may save image files using a first file naming convention, and a second software application running on the same computer device may save image files using a second file naming convention that is different from the first file naming convention.

A user may have more than one computer device on which files are saved. The different computer devices may each run a respective copy of a same software application that saves files locally in the respective device. In this situation, the software applications on the two devices may save image files using the same naming convention; however, the software applications operate independently of one another without taking into account file names that are generated by the other application.

SUMMARY

In a first aspect of the invention, there is a computer-implemented method comprising: receiving, by a naming server, user input defining a file naming convention; associating, by the naming server, the file naming convention with a user account; receiving, by the naming server, a first request for a file name from a first user device associated with the user account; generating, by the naming server, a first file name using the file naming convention in response to the first request; transmitting, by the naming server, the first file name to the first user device; receiving, by the naming server, a second request for a file name from a second user device associated with the user account, the second user device being different from the first user device; generating, by the naming server, a second file name using the file naming convention in response to the second request; and transmitting, by the naming server, the second file name to the second user device.

In another aspect of the invention, there is a computer program product for dynamically generating file names for files that are uploaded to shared storage. The computer program product includes a computer readable storage medium having program instructions embodied therewith. The program instructions are executable by a naming server to cause the naming server to: receive user input defining a file naming convention; associate the file naming convention with a user account; receive, from a first user device associated with the user account, a first file to save in shared storage associated with the user account; generate a first file name using the file naming convention in response to the receiving the first file; store the first file in the shared storage using the first file name; receive, from a second user device associated with the user account, a second file to save in the shared storage; generate a second file name using the file naming convention in response to the receiving the second file; and store the second file in the shared storage using the second file name.

In another aspect of the invention, there is system comprising: a naming server comprising a CPU, a computer readable memory, and a computer readable storage medium; program instructions to receive user input defining a file naming convention; program instructions to associate the file naming convention with a user account; program instructions to receive, from a first user device associated with the user account, a first file to save in shared storage associated with the user account; program instructions to generate a first file name using the file naming convention in response to the receiving the first file; program instructions to store the first file in the shared storage using the first file name; program instructions to receive, from a second user device associated with the user account, a second file to save in the shared storage; program instructions to generate a second file name using the file naming convention in response to the receiving the second file; and program instructions to store the second file in the shared storage using the second file name. The program instructions are stored on the computer readable storage medium for execution by the CPU via the computer readable memory. The first file name and the second file name each include a common string of characters defined by the file naming convention. The first file name and the second file are generated as part of a sequence, with the first file name including a string of characters identifying its unique position in the sequence and the second file name including a string of characters identifying its unique position in the sequence. The naming server stores plural file naming conventions associated with plural different user accounts. The naming server determines the file naming convention from the plural file naming conventions based on the identification information included in the first request and the second request.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
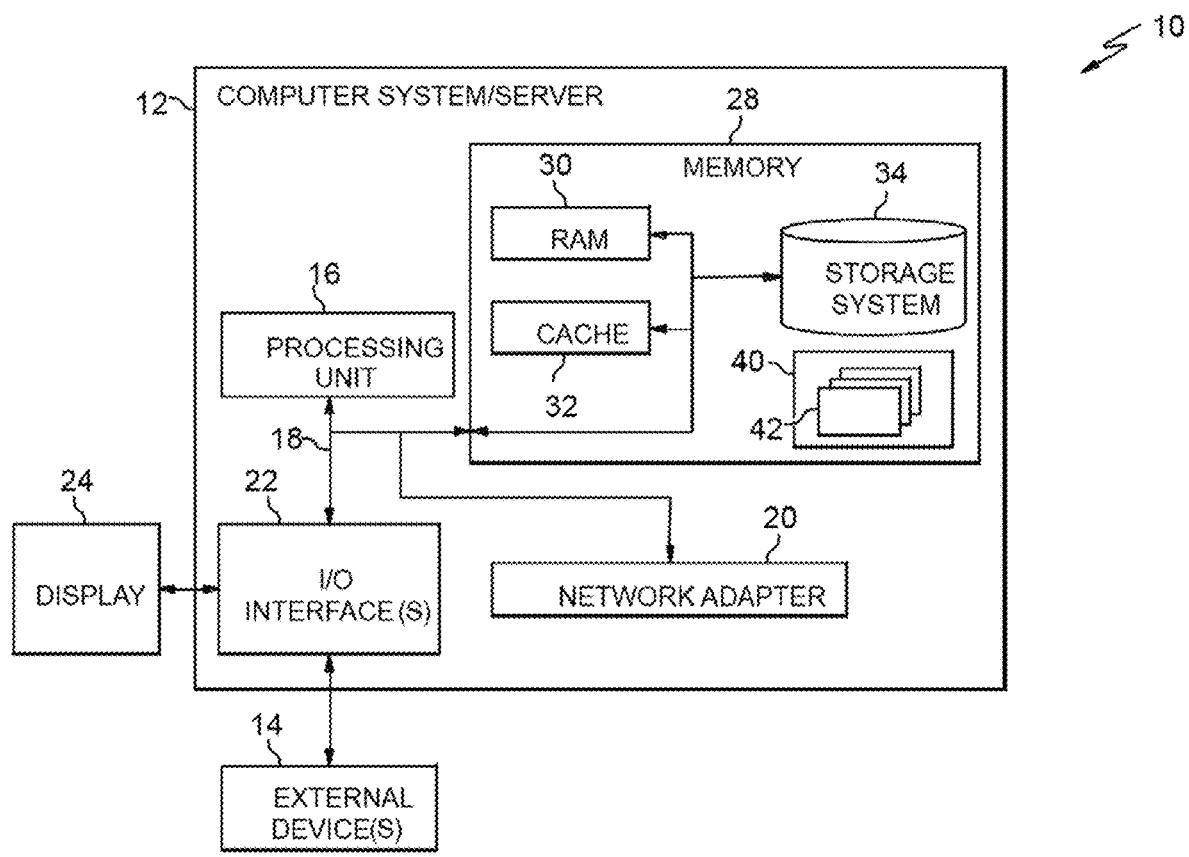
FIG. 1 depicts a cloud computing node according to an embodiment of the present invention.

The present invention generally relates to file naming and, more particularly, to dynamic file name generation for a plurality of devices. Aspects of the invention are directed to a system and method that dynamically apply a naming convention and a sequence of file names across multiple devices and platforms. In embodiments, a user connects their computer devices to a cloud service that is configured to passively monitor for new files created, saved, shared, etc., and which dynamically applies a naming convention to a file saved by one of the user computer devices based on a customization configured by the user or an administrator. In embodiments, when a user saves a file on any of one of their plural devices (or uploads a file from the device to cloud storage), the cloud service automatically names the file based on the user-configured naming convention. In this manner, files saved on different ones of the user devices (or uploaded to cloud storage from different ones of the user devices) are all saved with the same naming convention. Implementations of the invention provide the advantage of automatically maintaining a consistent sequence of file names across plural computer devices without requiring the user to manipulate file names after they are created.

In accordance with aspects of the invention, a set of plural computer devices linked to the cloud service can be used by one single user or plural different users. For example, a family or workplace may link a set of plural computer devices to the cloud service using a single account, and the cloud service will automatically apply naming conventions across all the linked devices. As described herein, the naming convention applied by the cloud service may be configured by the user. The file names generated using the naming convention may be relatively simple or relatively complex depending on the configuration.

Aspects of the invention are described herein with respect to image files for illustration. However, the invention is not limited to use with image files. Instead, aspects of the invention may be used with any desired file type including but not limited to image files, audio files, movie files, email files, word processing files, spreadsheet files, etc. Moreover, the cloud service provided in implementations of the invention may permit a user to customize different naming conventions for different types of files, e.g., a first file naming convention for all image files, a second file naming convention for all audio files, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
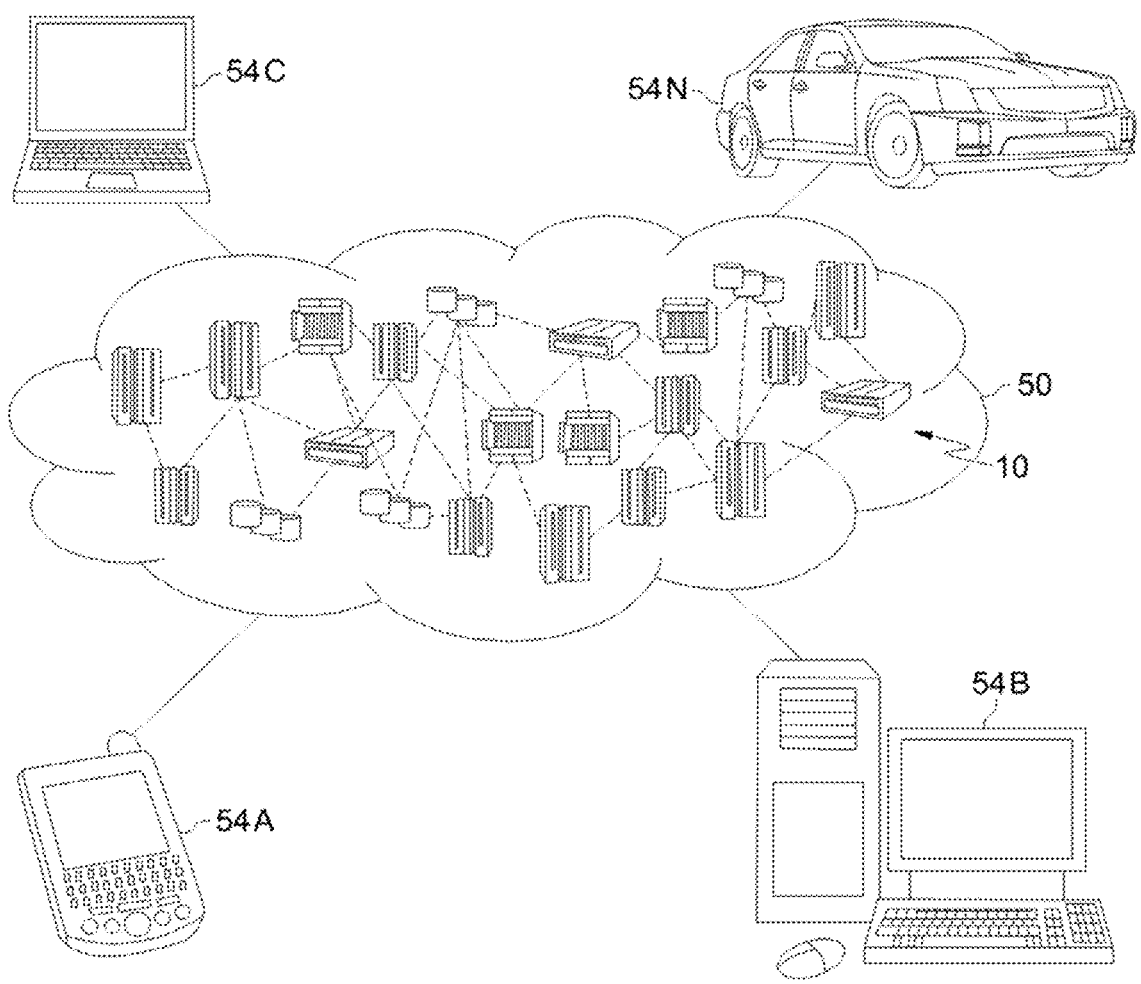
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
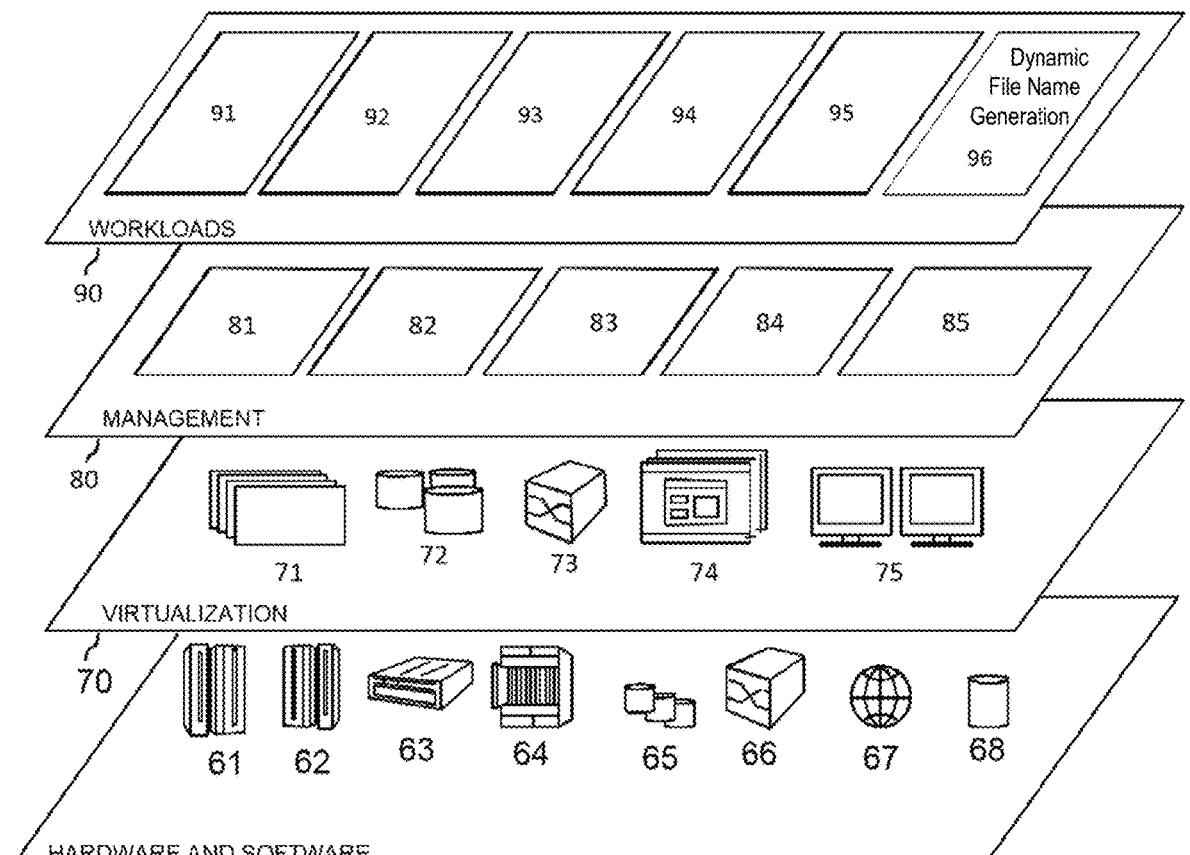
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamic file name generation 96.

In embodiments, the dynamic file name generation 96 includes: receiving input from a user device, the input defining a file naming convention; associating the file naming convention with a user account; receiving a first request for a file name from a first user device associated with the user account; generating a first file name using the file naming convention in response to the first request; transmitting the first file name to the first user device; receiving a second request for a file name from a second user device associated with the user account, the second user device being different from the first user device; generating a second file name using the file naming convention in response to the second request; and transmitting the second file name to the second user device. In embodiments, the first file name is different from the second file name. In embodiments, the first file name and the second file name have a common string of characters defined by the naming convention. The common string of characters may be at least one of a prepend string and a postpend string. In embodiments, the first file name and the second file are generated as part of a sequence, with the first file name having a string identifying its unique position in the sequence and the second file name having a string identifying its unique position in the sequence. The dynamic file name generation 96 may include a user authentication component, wherein unique file names are generated on a per-user basis (e.g., file names are only unique for the particular user account for which they are being generated and may be reused for other user accounts).

In another embodiment, the dynamic file name generation 96 includes: receiving input from a user device, the input defining a file naming convention; associating the file naming convention with a user account; receiving, from a first user device associated with the user account, a first file to save in shared storage associated with the user account; generating a first file name using the file naming convention in response to the receiving the first file; storing the first file in the shared storage using the first file name; receiving, from a second user device associated with the user account, a second file to save in shared storage associated with the user account; generating a second file name using the file naming convention in response to the receiving the second file; and storing the second file in the shared storage using the second file name. In embodiments, the first file name is different from the second file name. In embodiments, the first file name and the second file name have a common string of characters defined by the naming convention. The common string of characters may be at least one of a prepend string and a postpend string. In embodiments, the first file name and the second file are generated as part of a sequence, with the first file name having a string identifying its unique position in the sequence and the second file name having a string identifying its unique position in the sequence. The dynamic file name generation 96 may include a user authentication component, wherein unique file names are generated on a per-user basis (e.g., file names are only unique for the particular user account for which they are being generated and may be reused for other user accounts).

Figure 4:
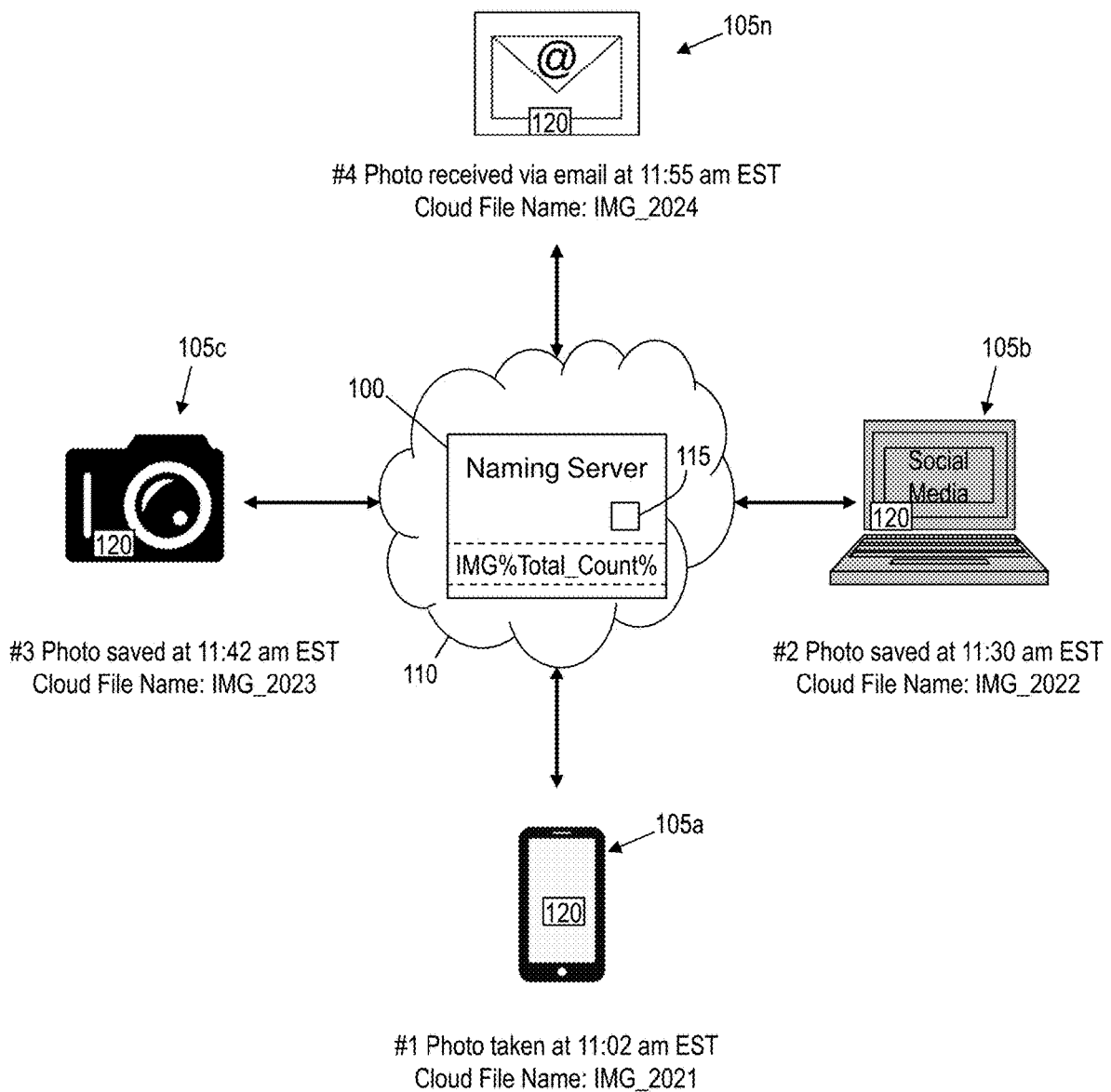
FIG. 4 shows a block diagram of an exemplary implementation in accordance with aspects of the invention.

FIG. 4 shows a block diagram of an exemplary implementation in accordance with aspects of the invention. In embodiments, the implementation includes a naming server 100 configured to communicate with plural user devices 105a-n via a network 110. The naming server 100 may comprise one or more computer servers similar to computer system/server 12 described with respect to FIG. 1. The naming server 100 may comprise a naming module 115 that is configured to carry out one or more processes in accordance with aspects of the invention. For, the naming module 115 may be configured to perform the dynamic file name generation 96 functionality described with respect to FIG. 3. The naming module 115 may comprise one or more program modules 42 as described with respect to FIG. 1.

The network 110 may be any communications network or group of communications networks, including but not limited to a local area network (LAN), a wide area network (WAN), and the Internet. In an embodiment, the network 110 is part of a cloud computing environment such as cloud computing environment 50 described with respect to FIG. 2, and the naming server 100 comprises one or more nodes 10 of the cloud computing environment 50. In the cloud-based implementation, the naming server 100 is configured as a cloud service provider that provides cloud-based services to the user devices 105a-n.

In accordance with aspects of the invention, each user device 105a-n is a respective computer device that is configured to save files. The computer devices may include, without limitation, smartphones, tablet computers, laptop computers, desktop computers, digital cameras, etc. In the example shown in FIG. 4, the user device 105a comprises a smartphone including a camera and memory, the smartphone being capable of taking a digital photograph with the camera and saving an image file of the digital photograph in the memory. Also in the example of FIG. 4, the user device 105b comprises a laptop computer including a memory, the laptop computer being capable of saving image files, such as those viewed via social media, in the memory. Still referring to the example shown in FIG. 4, the user device 105c comprises a digital camera including a memory, the digital camera being configured to capture a digital photograph and save an image file of the digital photograph in the memory. Continuing with the example shown in FIG. 4, the user device 105*n* may comprise any other type of computing device that is configured to store an image file in its memory. Although the example shown in FIG. 4 is described with respect to image files, other implementations of the invention may be used with other file types including but not limited to audio files, movie files, email files, word processing files, and spreadsheet files.

The user devices 105*a-n* may be based on different platforms. For example, the different user devices 105*a-n* may run different application programs that generate or capture their respective image files. As another example, the different user devices 105*a-n* may run different operating systems that save their respective image files. For example, the user device 105*a* may run a first operating system, the user device 105 may run a second operating system that is different from the first operating system, and the user device 105*c* may run a third operating system that is different from both the first and second operating systems.

According to aspects of the invention, the naming server 100 stores a naming convention that it uses to generate file names for files that are stored by each of the user devices 105*a-n*. In embodiments, when one of the devices saves a new image file (e.g., user device 105*a* takes a picture and saves the picture), the device contacts the naming server 100 and requests a file name. In response to receiving the request from the user device, the naming server 100 generates a new file name using a user-defined naming convention, and transmits the new file name to the user device that made the request. In response to receiving the file name from the naming server 100, the device that made the request saves the image file using the file name generated by the naming server 100. The naming server 100 is configured to operate in this manner to generate plural file names in response to plural requests from the user devices 105*a-n*. In embodiments, each one of the plural file names generated by the naming server 100 is unique, but all have a common string of characters defined by the naming convention. The common string of characters may be at least one of a prepend string and a postpend string. In embodiments, the plural file names generated by the naming server 100 are generated as part of a sequence, with each respective one of the plural file names having a string identifying its unique position in the sequence.

For illustration, as depicted in the example shown in FIG. 4, the naming server 100 stores a naming convention IMG % Total_Count % and applies this naming convention when generating file names for images files for the user devices 105*a-n*. In this exemplary naming convention, the string "IMG" is a prepend string that is common to all file names generated using this naming convention. Also in this exemplary naming convention, % Total_Count % represents a sequential string that is unique for each generated file name, in this example a total count of the number of file names generated by the naming server 100 using this naming convention.

In the example of FIG. 4, the user device 105*a* takes a digital photo at 11:02 am and requests a file name from the naming server 100. In response to the request, the naming server 100 uses the naming convention IMG % Total_Count % to generate the file name "IMG_2021" and transmits this file name back to the user device 105*a*. In response to receiving the file name "IMG_2021" from the naming server 100, the user device 105*a* saves the image file (locally in the memory of the user device 105*a*) using the file name "IMG_2021".

Continuing the example of FIG. 4, at 11:30 am the user device 105*b* saves a picture viewed on social media. As part of saving the picture as an image file in local memory, the user device 105*b* requests a file name from the naming server 100. In response to the request, the naming server uses the naming convention to generate the file name "IMG_2022" and transmits this file name back to the user device 105*b*. In response to receiving the file name "IMG_2022" from the naming server 100, the user device 105*b* saves the image file (locally in the memory of the user device 105*b*) using the file name "IMG_2022".

Continuing the example of FIG. 4, at 11:42 am the user device 105*c* takes a digital photo. As part of saving the digital photo as an image file in local memory, the user device 105*c* requests a file name from the naming server 100. In response to the request, the naming server uses the naming convention to generate the file name "IMG_2023" and transmits this file name back to the user device 105*c*. In response to receiving the file name "IMG_2023" from the naming server 100, the user device 105*c* saves the image file (locally in the memory of the user device 105*c*) using the file name "IMG_2023".

Continuing the example of FIG. 4, at 11:55 am the user device 105*n* saves a picture received via email. As part of saving the picture as an image file in local memory, the user device 105*n* requests a file name from the naming server 100. In response to the request, the naming server uses the naming convention to generate the file name "IMG_2024" and transmits this file name back to the user device 105*n*. In response to receiving the file name "IMG_2024" from the naming server 100, the user device 105*n* saves the image file (locally in the memory of the user device 105*n*) using the file name "IMG_2024".

As is evident from the example of FIG. 4, each file name that is generated according to the naming convention IMG % Total_Count % has a common string of "IMG" and a unique string of a count in a sequence, e.g., 2021, 2022, 2023, 2024, etc. As such, implementations of the invention dynamically generate a unique sequence of file names for plural different files that are saved on plural different user devices, wherein each of the unique file names has a string of characters in common with all of the other file names. In this manner, implementations of the invention reduce confusion caused by seemingly unrelated file names of same types of file (e.g., image files) saved on different user devices.

Still referring to FIG. 4, in embodiments a single user account is associated with the plural user devices 105*a-n*. For example, a user may register a user account with the naming server 100 and associate each of the user devices 105*a-n* with the user account. In this manner, the naming server 100 may be configured to apply the same naming convention to generate file names for plural different devices 105*a-n*. Similarly, other users may register other user accounts with the naming server 100, and each different user account may have its own naming convention. In this manner, the naming server 100 is configured to apply different naming conventions to generate file names for different user accounts.

In embodiments, the request from a user device 105*a-n* to the naming server 100 for a file name includes identification information associated with a user account. For example, the request may include user credentials (e.g., username and password, token, device identifier, etc.) associated with the user account. In this manner, in response to receiving a request for a file name, the naming server 100 uses the identification information included in the request to determine the user account, and generates the file name using the naming convention defined for the determined user account.

In embodiments, the request from a user device 105*a-n* to the naming server 100 for a file name includes data defining a file type for which the file name is being generated. For example, the request may include data defining a file type as image file, audio file, movie file, email file, word processing file, spreadsheet file, or any other file type. In this manner, when a user account has plural different naming conventions defined for plural different file types, the naming server 100 uses the file type data in a request to determine which of the plural file naming conventions to use for generating a file name in response to the request.

In embodiments, each user device 105*a-n* stores and runs a client application 120 that is configured to connect to the naming server 100. The client application 120 may be configured to communicate with the operating system of the user device to determine when a new file is being saved and, based on this determining, send the request to the naming server 100 for a new file name. As described, the request may include identification information and/or data defining a type of file being saved. The client application 120 may be configured to receive the new file name from the naming server 100 and to communicate the file name to the operating system of the user device for using when storing the new file in local memory of the user device.

In addition to the functions already described herein, aspects of the invention may also include a function to update file names after a loss of network connection. For example, in the event that one of the user devices 105*a-n* loses its network connection to the naming server 100, then upon re-establishing the network connection the device can contact the naming server 100 to request file names for files that were stored locally during the lost network connection. In this manner, files that are saved locally during a loss of network connection can be renamed in the local storage by sending a request to the naming server 100 after re-establishing the network connection.

Aspects of the invention may also include a function to convert file names generated using a first file naming convention to file names generated using a second file naming convention. For example, a user may change the definition of the naming convention associated with image files for the user account. Based on this change, the naming server 100 may generate new file names for all previously stored image files, the new names being based on the new naming convention defined by the user. In this manner, a user can convert previously saved file names to new file names based on a new naming convention.

Figure 5:
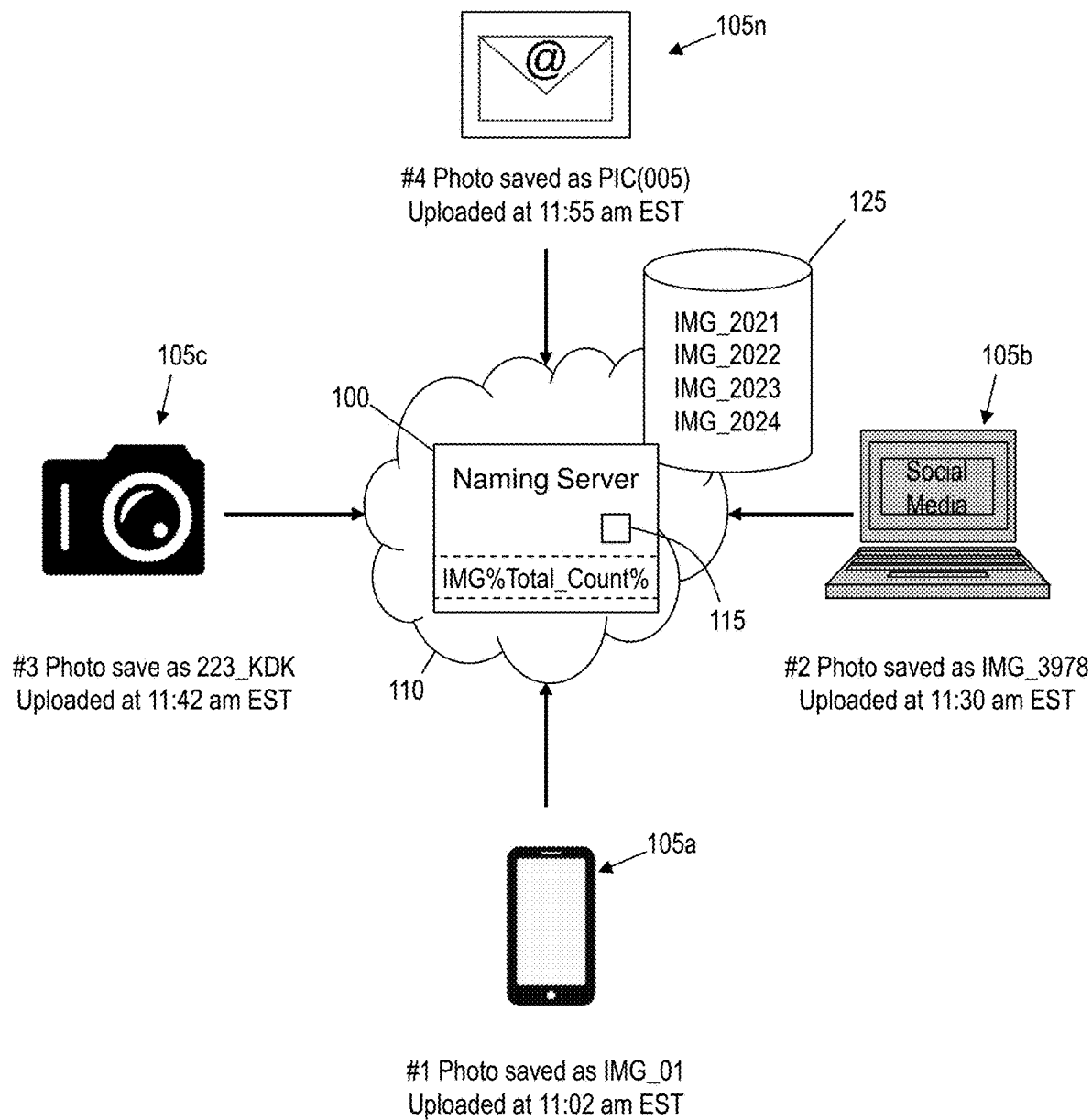
FIG. 5 shows a block diagram of another exemplary implementation in accordance with aspects of the invention.

FIG. 5 shows a block diagram of another exemplary implementation in accordance with aspects of the invention. The implementation of FIG. 5 includes a naming server 100, user devices 105*a-n*, and network 110 similar to those described with respect to FIG. 4. In the embodiment shown in FIG. 5, the naming server 100 includes or communicates with a shared storage system 125, such as a cloud storage system, that is usable by the user devices 105*a-n*. In the embodiment shown in FIG. 5, each user device 105*a-n* stores its files locally in a conventional manner, e.g., using a naming convention defined by a respective application or operating system running on the user device, and without contacting the naming server 100 for a file name. According to aspects of the invention, when the user devices 105*a-n* upload files to the shared storage system 125, the naming server 100 applies the naming convention to generate file names for the files that are saved in the shared storage system 125.

For illustration, as depicted in the example shown in FIG. 5, the naming server 100 stores a naming convention IMG % Total_Count % and applies this naming convention when generating file names for images files that are uploaded (from any of the user device 105*a-n*) to the shared storage system 125. For example, the user device 105*a* locally stores an image file named IMG_01, the user device 105*b* locally stores an image file named IMG_3978, the user device 105*c* locally stores an image file named 223_KDK, and the local device 105*n* locally stores an image file named PIC(005). Still referring to the example shown in FIG. 5, at 11:02 am the user device 105*a* uploads the file IMG_01 to the shared storage system 125. Based on the upload, the naming server 100 uses the naming convention to generate the file name IMG_2021, and the file that was locally stored as IMG_01 is stored in the shared storage system 125 with the file name IMG_2021.

Continuing the example shown in FIG. 5, at 11:30 am the user device 105*b* uploads the file IMG_3978 to the shared storage system 125. Based on the upload, the naming server 100 uses the naming convention to generate the file name IMG_2022, and the file that was locally stored as IMG_3978 is stored in the shared storage system 125 with the file name IMG_2022.

Continuing the example shown in FIG. 5, at 11:42 am the user device 105*c* uploads the file 223_KDK to the shared storage system 125. Based on the upload, the naming server 100 uses the naming convention to generate the file name IMG_2023, and the file that was locally stored as 223_KDK is stored in the shared storage system 125 with the file name IMG_2023.

Continuing the example shown in FIG. 5, at 11:55 am the user device 105*n* uploads the file PIC(005) to the shared storage system 125. Based on the upload, the naming server 100 uses the naming convention to generate the file name IMG_2024, and the file that was locally stored as PIC(005) is stored in the shared storage system 125 with the file name IMG_2024.

As is evident from the example of FIG. 5, each file name that is generated according to the naming convention IMG % Total_Count % has a common string of "IMG" and a unique string of a count in a sequence, e.g., 2021, 2022, 2023, 2024, etc. As such, implementations of the invention dynamically generate a unique sequence of file names for plural different files that are uploaded to and saved in the shared storage system 125, wherein each of the unique file names has a string of characters in common with all of the other file names. As depicted in the example of FIG. 5, the naming server 100 is thus configured to accept plural different files that are initially named using different naming conventions (e.g., IMG_01, IMG_3978, 223_KDK, PIC (005)), and to apply the single naming convention (e.g., IMG % Total_Count %) to generate new file names for the files stored at the shared cloud storage 125 (e.g., IMG_2021, IMG_2022, IMG_2023, IMG_2024).

Figure 6:
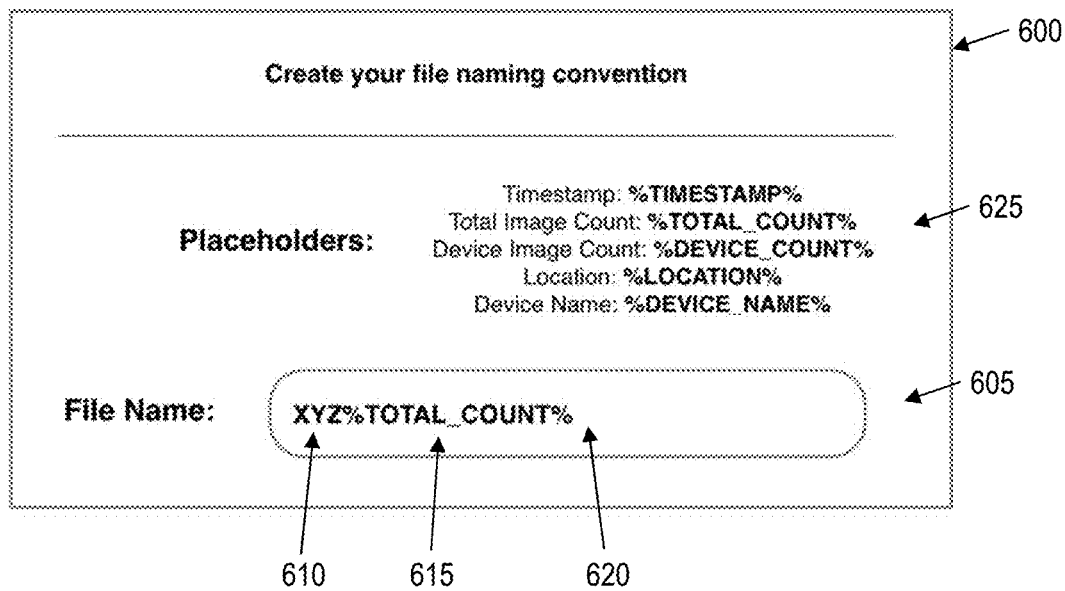
FIGS. 6 and 7 show exemplary user interfaces in accordance with aspects of the invention.
Figure 7:
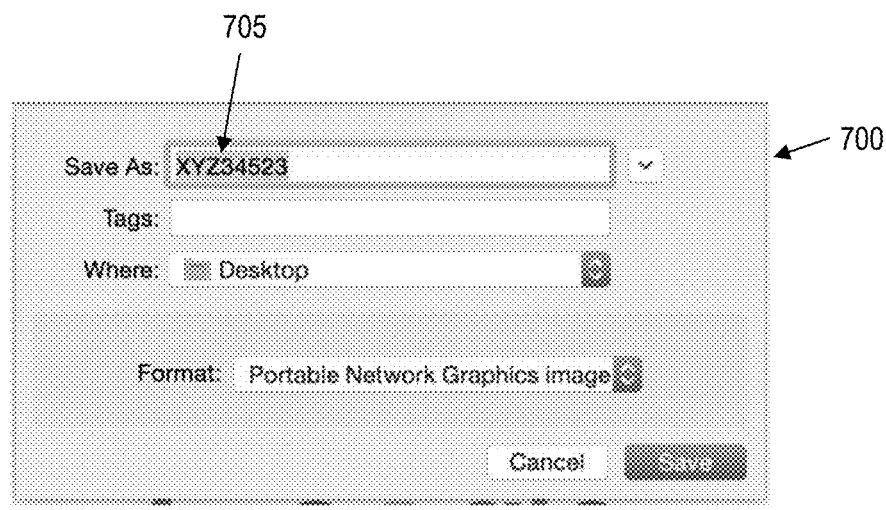

FIGS. 6 and 7 show exemplary user interfaces in accordance with aspects of the invention. FIG. 6 shows a first user interface (UI) 600 that is configured to be displayed on one or more of the user devices 105*a-n* for the purpose of receiving user input to define the file naming convention that is used by the naming server 100 as described herein. In embodiments, the UI 600 includes an input area 605 in which the user may input: a prepend string 610; one or more placeholders for unique identifiers 615; and a postpend string 620. The prepend string 610 in the UI 600 is "XYZ" in contrast to the prepend string "IMG" shown used in FIGS. 4 and 5. The prepend string 610 and the postpend string 620 may be any string of characters defined by the user. The one or more placeholders for unique identifiers 615 may be selected from a list 625 of available placeholders, which may include for example: a timestamp, an incremental counter, location coordinates, time and/or date, special characters, and device name.

Still referring to FIG. 6, the naming server 100 is configured to receive the user input defining the naming convention from UI 600 and determine it will save unique names for each file. For example, a user-defined name convention of "XYZ % Device_Name %" would not generate unique file names for image files from the same device (e.g., user device 105*a*). In embodiments, in response to determining that the user-defined naming convention will not save unique names for each file, the naming server 100 prompts the user, via the UI 600, to define a different naming convention. In further embodiments, the naming server 100 is configured to suggest a naming convention to the user via the UI 600. For example, the naming server 100 may search and analyze files already stored on the user device 105*a* and suggest a naming convention based on this analysis. In response to the suggestion, the user may accept the suggested naming convention or modify it via the UI 600.

FIG. 7 shows a second user interface (UI) 700 that is configured to be displayed on one or more of the user devices 105*a-n* for the purpose of accepting or modifying the file name generated by the naming server 100. In either implementation of FIGS. 4 and 5, the naming server 100 may be configured to transmit the file name generated using the file naming convention to the user device (e.g., user device 105*a*). In embodiments, the UI 700 displays the file name received from the naming server 100 as a suggested file name 705. The user may accept or modify the file name via the UI 700, and the file is then saved with the file name provided by the user.

Figure 8:
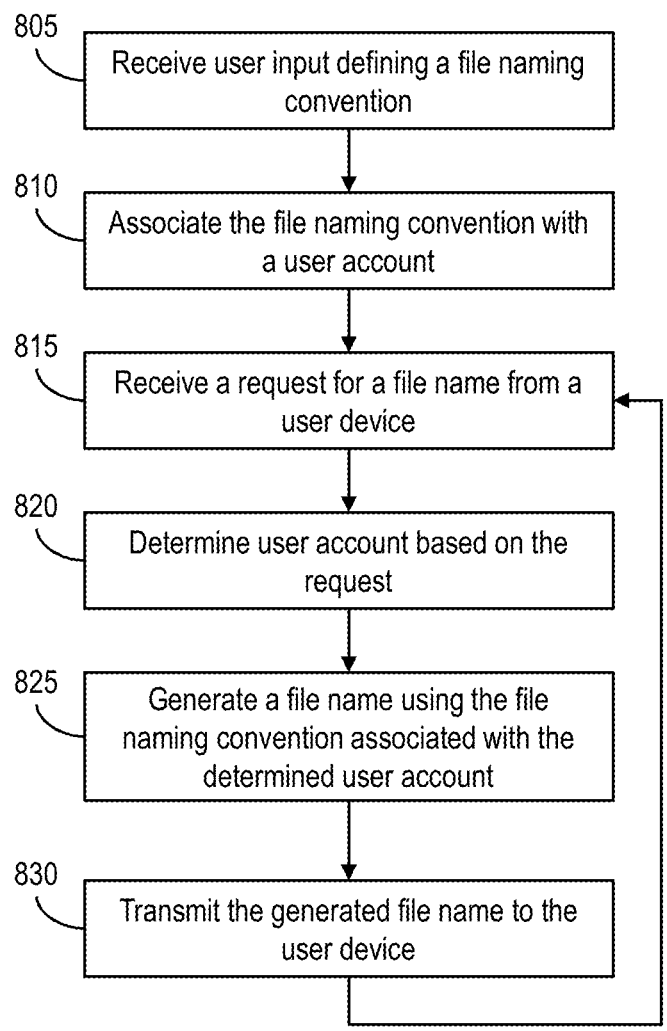
FIGS. 8 and 9 show flowcharts of methods in accordance with aspects of the invention.

FIG. 8 shows an example flowchart of a process for enabling an offline mode for a user device. The steps of FIG. 8 may be implemented in the environment of FIG. 4, for example, and are described using reference numbers of elements depicted in FIG. 4. As noted above, the flowchart illustrates the architecture, functionality, and operation of possible implementations of systems, methods, and computer program products according to various embodiments of the present invention.

At step 805, the naming server 100 receives user input defining a file naming convention. This step may be performed in the manner described with respect to FIGS. 4 and 6. For example, a user may use UI 600 at user device 105*a* to provide input that defines the naming convention, and this input may be received by the naming server 100 from the user device 105*a*.

At step 810, the naming server 100 associates the file naming convention (from step 805) with a user account. This step may be performed in the manner described with respect to FIG. 4.

At step 815, the naming server 100 receives a request for a file name. This step may be performed in the manner described with respect to FIG. 4. For example, one of the user devices 105*a-n* may send a request for a file name to the naming server 100 via the network 110.

At step 820, the naming server 100 determines the user account based on the request from step 815. This step may be performed in the manner described with respect to FIG. 4. For example, the request may include identification information that the naming server 100 uses to determine the user account. For example, based on the determining the user account, the naming server 100 determines the file naming convention associated with the determined user account.

At step 825, the naming server 100 generates a file name using the file naming convention associated with the determined user account form step 820. This step may be performed in the manner described with respect to FIG. 4. For example, the naming server 100 may generate the next file name in the sequence defined by the file naming convention.

At step 830, the naming server 100 transmits the generated file name back to the user device that made the request. This step may be performed in the manner described with respect to FIG. 4. For example, the naming server 100 may transmit the file name to the user device 105*a* via the network 110. The user of the user device 105*a* may view the generated file name in UI 700 and accept the generated file name or change the file name to something else. The file is then saved locally in the memory of the user device 105*a* with the file name that the user accepted or changed in UI 700.

After step 830, the process returns to step 815 and repeats for subsequent requests from the same user device or different user devices. In this manner, the naming server 100 generates plural unique file names using the naming convention.

Figure 9:
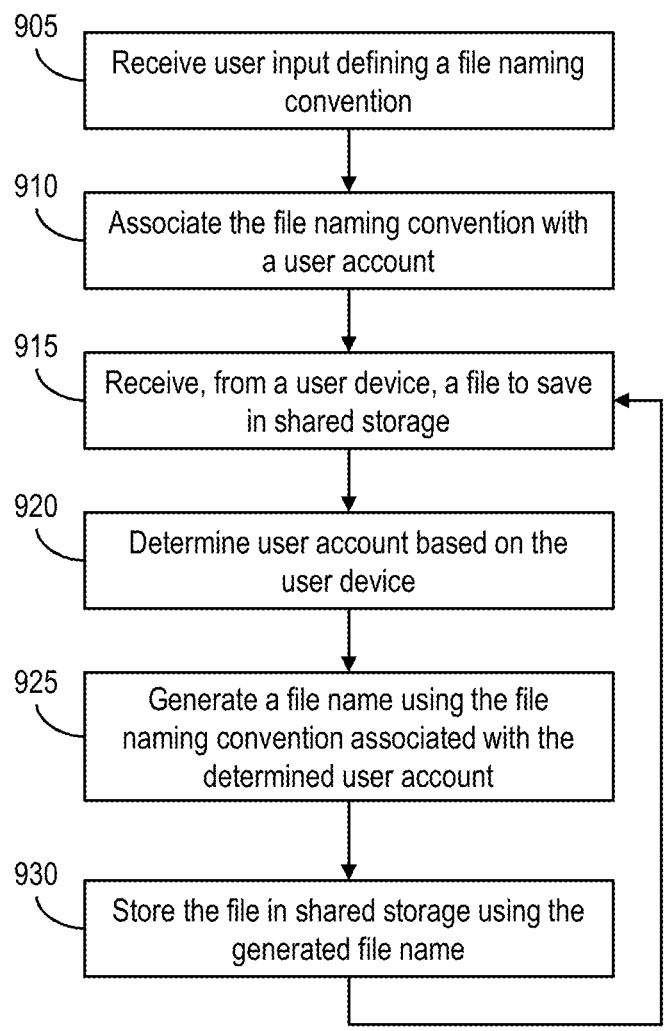

FIG. 9 shows an example flowchart of a process for enabling an offline mode for a user device. The steps of FIG. 9 may be implemented in the environment of FIG. 5, for example, and are described using reference numbers of elements depicted in FIG. 5. As noted above, the flowchart illustrates the architecture, functionality, and operation of possible implementations of systems, methods, and computer program products according to various embodiments of the present invention.

Steps 905 and 910 are the same as steps 805 and 810 described with respect to FIG. 8. At step 915, the naming server 100 receives a file to save in the shared storage system 125. This step may be performed in the manner described with respect to FIG. 5. For example, the user device 105*a* may upload the file via the network. The upload may include a request to save the file in the shared storage system 125. The request may include identification information as described herein.

At step 920, the naming server 100 determines the user account based on the user device. This step may be performed in the manner described with respect to FIG. 5. For example, the user device 105*a* may upload the file via the network. The upload may include a request to save the file in the shared storage system 125. The request may include identification information as described herein. The naming server 100 may determine the user account based on the identification information. Based on the determining the user account, the naming server 100 may determine the file naming convention associated with the determined user account.

At step 925, the naming server 100 generates a file name using the file naming convention associated with the determined user account form step 920. This step may be performed in the manner described with respect to FIG. 5. For example, the naming server 100 may generate the next file name in the sequence defined by the file naming convention.

At step 930, the naming server 100 stores the file (from step 915) in the shared storage system 125 using the file name generated at step 925. This step may be performed in the manner described with respect to FIG. 5.

After step 930, the process returns to step 915 and repeats for subsequent requests from the same user device or different user devices. In this manner, the naming server 100 generates plural unique file names using the naming convention.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for dynamically generating file names for files that are uploaded to shared storage, the computer program product comprising a computer readable storage medium having program instructions embodied therewith, the program instructions executable by a naming server to cause the naming server to:
   receive user input defining a file naming convention;
   associate the file naming convention with a user account;
   receive, from a first user device associated with the user account, a first file to save in shared storage associated with the user account;
   generate a first file name using the file naming convention in response to the receiving the first file;
   store the first file in the shared storage using the first file name;
   receive, from a second user device associated with the user account, a second file to save in the shared storage;
   generate a second file name using the file naming convention in response to the receiving the second file; and
   store the second file in the shared storage using the second file name,
   wherein the first file has a first local file name according to a first local naming convention when it is received by the naming server;
   the second file has a second local file name according to a second local naming convention when it is received by the naming server, the second local naming convention being different than the first local naming convention; and
   the naming server uses the file naming convention, which is a single naming convention of the naming server, to generate both the first file name and the second file name for respective copies of the first file and the second file that are stored at the shared storage.

2. The computer program product of claim 1, wherein the first file name is different from the second file name.

3. The computer program product of claim 2, wherein the first file name and the second file name each include a common string of characters defined by the file naming convention.

4. The computer program product of claim 3, wherein the common string of characters is one of a prepend string and a postpend string.

5. The computer program product of claim 4, wherein the first file name and the second file are generated as part of a sequence, with the first file name including a string of characters identifying its unique position in the sequence and the second file name including a string of characters identifying its unique position in the sequence.

6. The computer program product of claim 1, wherein the file naming convention is a first file naming convention, and the program instructions are executable by the naming server to cause the naming server to:
   receive, by the naming server, user input defining a second file naming convention that is different from the first file naming convention;
   generate, by the naming server, a new first file name using the second file naming convention;
   rename the first file in the shared storage using the new first file name;
   generate, by the naming server, a new second file name using the second file naming convention; and
   rename the second file in the shared storage using the new second file name.

7. The computer program product of claim 1, wherein:
   the naming server stores plural file naming conventions associated with plural different user accounts;
   the first request includes identification information associated with the user account; and
   the generating the first file name using the file naming convention comprises determining the file naming convention from the plural file naming conventions based on the identification information associated with the user account.

8. The computer program product of claim 1, wherein the computer program product is provided as software-as-a-service in a cloud environment.

9. The computer program product of claim 1, wherein the program instructions are executable by the naming server to cause the naming server to:
   generate a user interface that permits a user to provide input that defines the file naming convention, the input including: prepend string; postpend string; timestamp; incremental counter; location coordinates; and device name.

10. A system comprising:
   a naming server comprising a CPU, a computer readable memory, and a computer readable storage medium;
   program instructions to receive user input defining a file naming convention;

program instructions to associate the file naming convention with a user account;

program instructions to receive, from a first user device associated with the user account, a first file to save in shared storage associated with the user account;

program instructions to generate a first file name using the file naming convention in response to the receiving the first file;

program instructions to store the first file in the shared storage using the first file name;

program instructions to receive, from a second user device associated with the user account, a second file to save in the shared storage;

program instructions to generate a second file name using the file naming convention in response to the receiving the second file; and program instructions to store the second file in the shared storage using the second file name, wherein the program instructions are stored on the computer readable storage medium for execution by the CPU via the computer readable memory;

the first file name and the second file name each include a common string of characters defined by the file naming convention;

the first file name and the second file are generated as part of a sequence, with the first file name including a string of characters identifying its unique position in the sequence and the second file name including a string of characters identifying its unique position in the sequence;

the naming server stores plural file naming conventions associated with plural different user accounts; and the naming server determines the file naming convention from the plural file naming conventions based on the identification information included in the first request and the second request.

11. The system of claim 10, wherein:

the first file has a first local file name according to a first local naming convention when it is received by the naming server;

the second file has a second local file name according to a second local naming convention when it is received by the naming server, the second local naming convention being different than the first local naming convention;

the naming server uses the file naming convention, which is a single naming convention of the naming server, to generate both the first file name and the second file name for respective copies of the first file and the second file that are stored at the shared storage.

12. The system of claim 10, wherein the receiving the user input defining the file naming convention comprises:

determining a user-defined naming convention will not save unique names for each file; and in response to the determining, prompt the user to define a different naming convention.

13. The system of claim 10, wherein the receiving the user input defining the file naming convention comprises suggesting a naming convention to the user.

14. The system of claim 13, wherein the suggested naming convention is based on an analysis of files stored on the first user device.

15. The system of claim 14, wherein the user may accept the suggested naming convention or modify the suggested naming convention.

16. The system of claim 10, wherein the naming server transmits the first file name generated using the file naming convention to the first user device and the user may accept the first file name or modify the first file name.

17. The computer program product of claim 1, wherein the receiving the user input defining the file naming convention comprises:

determining a user-defined naming convention will not save unique names for each file; and in response to the determining, prompt the user to define a different naming convention.

18. The computer program product of claim 1, wherein the receiving the user input defining the file naming convention comprises suggesting a naming convention to the user.

19. The computer program product of claim 18, wherein the suggested naming convention is based on an analysis of files stored on the first user device.

20. The computer program product of claim 19, wherein the user may accept the suggested naming convention or modify the suggested naming convention.

\* \* \* \* \*